(12) United States Patent
Fleischer

(10) Patent No.: US 6,442,788 B1
(45) Date of Patent: Sep. 3, 2002

(54) NOZZLE DEVICE AND A WINDSHIELD WIPER ARM FOR ACCOMMODATING THE NOZZLE DEVICE

(75) Inventor: Claus Fleischer, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/647,569
(22) PCT Filed: Oct. 28, 1999
(86) PCT No.: PCT/DE99/03452
§ 371 (c)(1), (2), (4) Date: Oct. 2, 2000
(87) PCT Pub. No.: WO00/47456
PCT Pub. Date: Aug. 17, 2000

(30) Foreign Application Priority Data

Feb. 8, 1999 (DE) .......................... 199 04 964

(51) Int. Cl.⁷ ................ B60S 1/52; B60S 1/46
(52) U.S. Cl. .............. 15/250.04; 239/284.1; 15/250.351
(58) Field of Search .............. 15/250.04, 250.01, 15/250.351, 250.352; 239/284.1, 284.2

(56) References Cited

U.S. PATENT DOCUMENTS

| | | | | |
|---|---|---|---|---|
| 3,149,361 A | * | 9/1964 | Ziegler | 15/250.04 |
| 3,432,876 A | * | 3/1969 | Edwards | 15/250.04 |
| 3,827,101 A | * | 8/1974 | Wubbe | 15/250.04 |
| 4,133,071 A | * | 1/1979 | Jaske | 15/250.04 |
| 4,261,074 A | * | 4/1981 | Bauer et al. | 15/250.351 |
| 5,239,726 A | * | 8/1993 | Bianco | 15/250.04 |
| 5,327,614 A | * | 7/1994 | Egner-Walter et al. | 15/250.04 |
| 5,724,699 A | * | 3/1998 | Bexten | 15/250.04 |
| 5,842,251 A | * | 12/1998 | LeFrancois et al. | 15/250.14 |
| 5,903,953 A | * | 5/1999 | Dimur et al. | 15/250.04 |
| 6,094,772 A | * | 8/2000 | West | 15/250.04 |

FOREIGN PATENT DOCUMENTS

| | | | | |
|---|---|---|---|---|
| DE | 37 44 237 A1 | | 7/1989 | |
| DE | 198 15 171 A1 | | 6/1999 | |
| EP | 330 458 | * | 8/1989 | |
| FR | 2684343 | * | 6/1993 | |
| GB | 2047079 | * | 11/1980 | 15/250.04 |

* cited by examiner

Primary Examiner—Gary K. Graham
(74) Attorney, Agent, or Firm—Michael J. Striker

(57) ABSTRACT

A wiper arm (10), which is constructed from a fastening element (12) and a hinge part (14) is pivotably connected to it via a swivel joint (18), with a wiper rod (36) on which a wiper blade (22) is pivotably connected. The hinge part (14) has a U-shaped profile open toward a wiping field (46) and carries at least one spray nozzle (42). The spray nozzle (42) is placed in a lower part (68) of a nozzle body (38, 40) which is inserted into the U-shaped profile and with its lower part (68) protrudes toward the wiping field (46).

14 Claims, 4 Drawing Sheets

NOZZLE DEVICE AND A WINDSHIELD WIPER ARM FOR ACCOMMODATING THE NOZZLE DEVICE

BACKGROUND OF THE INVENTION

The present invention relates generally to a wiper arm for windshield wipers of a vehicle Known windshield wipers have a wiper arm, which is made up of a fastening element and a hinge part, which is pivotably connected to it via a swivel joint and has a wiper rod. A hooklike end of the wiper rod engages a suspension box of a wiper blade, which is formed by two side cheeks of a middle bracket and includes a hinge bolt The hinge thus formed guides the wiper blade over the vehicle window during the swiveling motion. The wiper blade has what is as a rule a multi-member support bracket system, with subordinate brackets pivotably connected to the middle bracket, at least some of which subordinate brackets, with claws on their ends, retain a wiper strip by its head strip. The multi-member support bracket system and spring rails plated in the head strip make it possible during wiping for the wiper strip to adapt, with a uniform contact pressure, to a curved windshield. To that end, a tension spring prestresses the swivel joint.

Such windshield wipers are known, for instance from German Patent Disclosure DE 37 44 237 A1. In simple versions, subordinate brackets, also known as intermediate brackets and claw brackets, can be dispensed with. In the simplest case, the middle bracket itself has claws, with which it retains the wiper strip. Windshield washing systems for vehicles are as a rule used in conjunction with windshield wipers. They are actuated if the moisture from precipitation does not suffice to clean the vehicle window. They include a water container, spray nozzles, and a pump, which pumps water, sometimes admixed with cleaning and antifreeze agents, under pressure out of the water container to the spray nozzles.

It is already known for spray nozzles to be secured as additional components to the wiper blade and thus for the spray water to be distributed over the wiping region directly with a short length of stream. Since the spray water is concentrated on a region in the vicinity of the wiper blade and is washed off again within the shortest possible time by the wiping motion, the view is hindered only briefly by the spray water applied. One disadvantage of such systems is that the effects of weather, especially hail and strong sunshine, greatly affect the flexible parts of this arrangement, which are needed for spanning the hinged regions between the wiper arm and the wiper blade. Furthermore, the spray nozzles and water lines, which are exposed to the relative wind, rapidly freeze closed at temperatures below the freezing points, unless antifreeze is admixed with the water. Frozen water lines and spray nozzles can be defrosted again as a rule only with great effort.

It is also known for spray nozzles to be solidly integrated with the wiper arm, for instance the connection piece to the wiper blade or the fastening element secured to the drive shaft. If the spray nozzles or the water supply lines fail from being stopped up, broken, or the like, then the complete wiper arm has to be replaced.

In an earlier German Patent Application, DE 198 15 171.3, a wiper arm is described on the hinge part of which, or a wiper rod integrally connected to the hinge part, spray nozzles are disposed. The spray nozzles are located in a nozzle body, which is accommodated in a bulge of the hinge part that has an injection opening for the spray stream, or is clipped, protruding downward, in a lateral mount on the wiper rod. It is also possible for two nozzle bodies to be provided, which are joined to one another by means of a rigid or flexible connecting piece. The nozzle bodies are easily replaced and are well protected from environmental factors.

A heating device, passed in the form of a wire through a water supply line and embodied as a heating coil in the nozzle body, is integrated into the arrangement of spray nozzles. Simple versions are obtained by providing that the nozzle bodies are integrally joined together and are produced from plastic as an injection-molded part. By means of the nozzle bodies distributed along the wiper arm, the spray water is well distributed over the wiping region, especially if a spray stream is directed into a lower region directly in front of the wiper blade. Since this arrangement results in short stream lengths, the relative wind can have only little effect on spray water distribution, even at a relatively high vehicle speed. Because of the different ways they are fastened to the hinge part or the wiper rod, the nozzle bodies are fundamentally designed differently, so that for the most various wiper arms, numerous variant forms of nozzle bodies must be made available. Furthermore, the arrangement of spray nozzles and the orientation of the spray streams are limited by the shape and orientation of the hinge part relative to the wiper blade.

SUMMARY OF THE INVENTION

According to the invention, the spray nozzles are let into a lower portion of a nozzle body that is inserted into the U-shaped profile of the wiper arm. The lower part of the nozzle body protrudes, toward the field to be wiped, out of the hinge part or the wiper rod. It serves above all for the disposition of the spray nozzles and is largely independent of the design of the particular wiper arm or the wiper rod formed onto it. The spray nozzles can be disposed on the long side, located in the starting direction of the wiper arm, or on the face end located longitudinally of the wiper arm, and/or on the bottom of the nozzle body. At least one of the spray streams of these spray nozzles is expediently oriented at a small angle a to the wiper blade and meets the wiping field in the region of the inner circle of the wiper blade. Providing a spray nozzle on the face end or bottom is especially advantageous in the case of windshield wipers in which the wiper arm is offset from the wiper blade in the starting direction. The spray streams can thus be oriented approximately parallel to the wiper blade. They are protected from the relative wind on side by the wiper blade and from above by the hinge part and the wiper rod, and they reach the wiping field with a short stream length, so that the relative wind has hardly any influence on the distribution of spray water over the wiping field.

The upper part of the nozzle body serves to mount it in the U-shaped profile of the hinge part or of the integrated wiper rod; on its long sides, the nozzle body has bearing faces with which it rests on the face ends of the side walls of the U-shaped profile. The nozzle body can be retained in the U-shaped profile by nonpositive engagement, in that a lateral spring tongue is braced on the side wall of the hinge part and presses the nozzle body against the opposite side wall. The spring tongue can be designed such that the nozzle body is suitable for different widths of U- shaped profile and can also be retrofitted into existing windshield wipers.

The nonpositive engagement can be replaced by a positive engagement or can be supplemented by snapping the spring tongue into an opening of the side wall or having it engage a heel, on the adjacent side wall of the hinge part in the region of the nozzle body, from behind. This heel can be formed by an inward-bent part of the side wall of the hinge part or the wiper rod. On the side opposite the spring tongue, the nozzle body expediently rests on the side wall with a bead extending longitudinally. Because of the linear contact, the nozzle body can rest flush with its bearing faces on the side walls of the hinge part or wiper rod, regardless of any angle tolerances on the U-shaped profile.

In principle, it suffices if only one nozzle body is disposed in the region of the hinge part. However, for better distribution of the spray water, two nozzle bodies are advantageous, either accommodated spaced apart from one another in a long hinge part, or with one of them disposed in a hinge part and the other in a wiper rod that is formed integrally onto the hinge part.

BRIEF DESCRIPTION OF THE DRAWINGS

Further advantages will become apparent from the ensuing description of the drawing. In the drawing, exemplary embodiments of the invention are shown. The drawing, description and claims include numerous characteristics in combination. One skilled in the art will also expediently consider the characteristics individually and combine them into suitable further combinations.

Shown are.

DETAILED DESCRIPTION OF THE PREFERRED EMBODIMENTS

Figure 1:
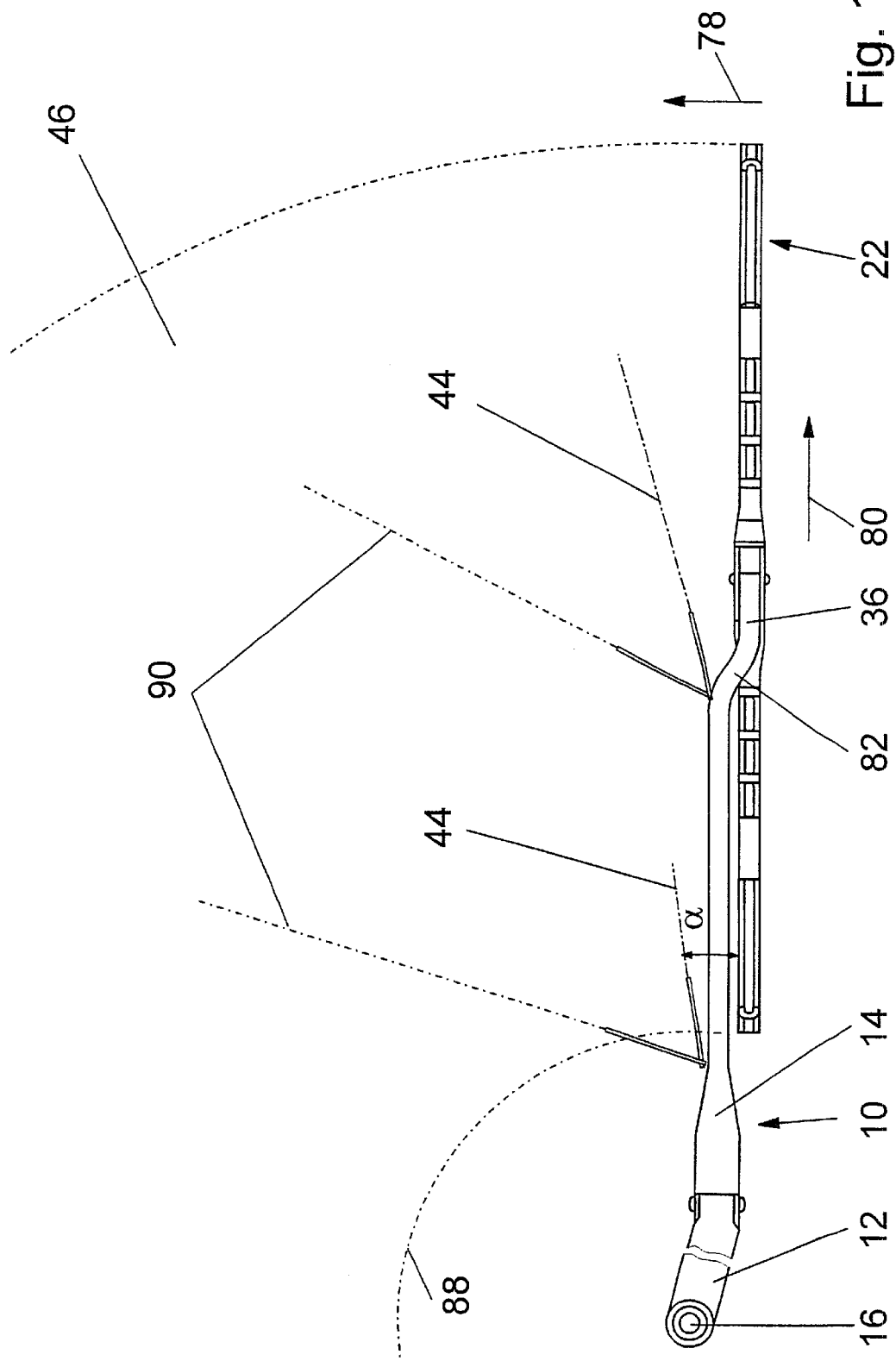
FIG. 1, a windshield wiper with a wiper arm and a wiper blade, in a plan view.
Figure 2:
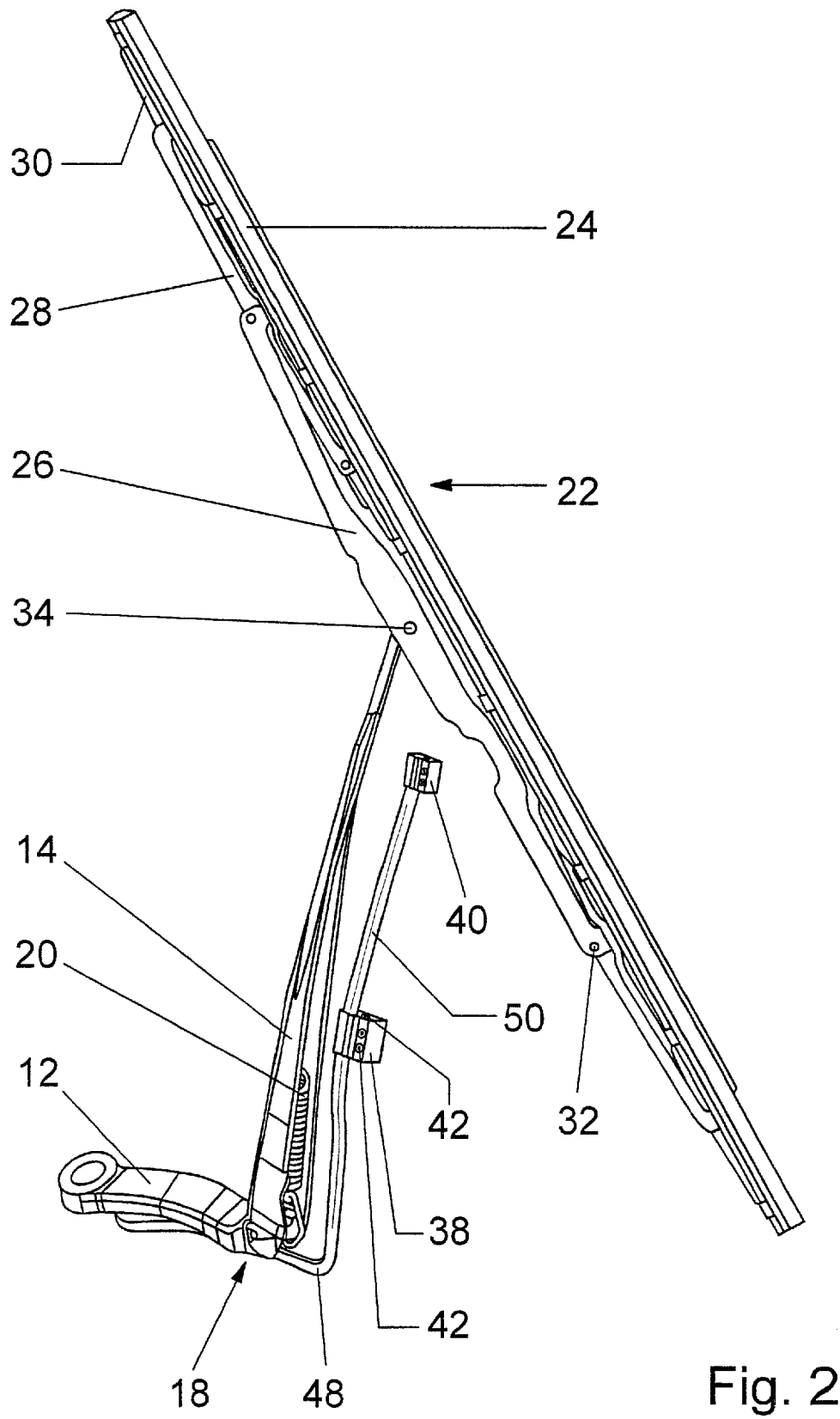
FIG. 2, a windshield wiper in a perspective view, with a wiper blade swiveled out of the way.
Figure 3:
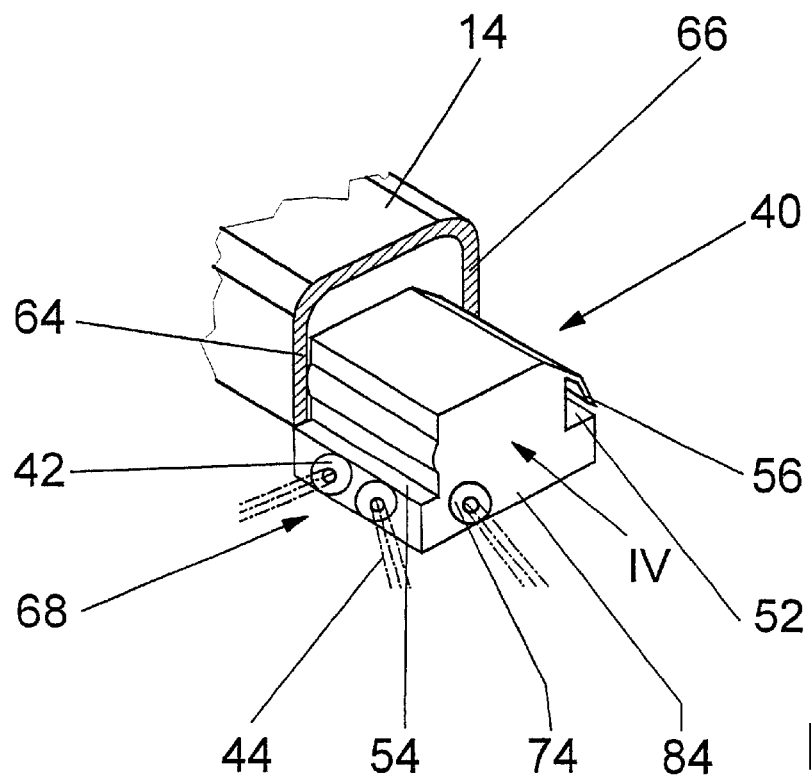
FIG. 3, a nozzle body in a perspective view.

The windshield wiper in FIGS. 1 and 2 has a wiper arm 10, which guides a wiper blade 22 over a wiping field 46 on a windshield. The wiper arm 10 is constructed of a fastening element 12, which is secured to a drive shaft 16, and a hinge part 14 having a wiper rod 36. Via a swivel joint 18, the hinge part 14 is pivotably connected to the fastening element 12, which is prestressed via a tension spring 20 that engages the fastening element 12 and the hinge part 14. Thus the tension spring 20 on the one hand, via the wiper arm 10, presses the wiper blade 22 against the wiping field 46, and on the other keeps the hinge part 14 with the wiper rod 36 in a position folded out of the way, so that the wiper blade 22 can be cleaned or changed.

The wiper blade 22 has a middle bracket 26, intermediate brackets 28, and claw brackets 30, which retain a wiper strip 24. The aforementioned brackets 26, 28 and 30 are pivotably connected to one another via hinge pins 32, so that the wiper strip 24 can adapt to a curvature of the wiping field 46. The wiper rod 36, which is expediently formed integrally onto the hinge part 14, with one end fits around a hinge bolt 34 in the middle bracket 26 and thus together with it forms a hinge.

The hinge part 14 and the wiper rod 36 formed onto it have a U-shaped profile, open toward the wiping field 46, into which two nozzle bodies 38, 40 are inserted from below. The nozzle body 38 is disposed in the region of the hinge part 14 behind the tension spring 20, while the nozzle body 40 is inserted in the region of the wiper rod 36 on the end located close to the hinge bolt 34. The nozzle bodies 38, 40 are joined to one another by a flexible or rigid connecting piece 50 and are easy to replace or to add by retrofitting.

Figure 5:
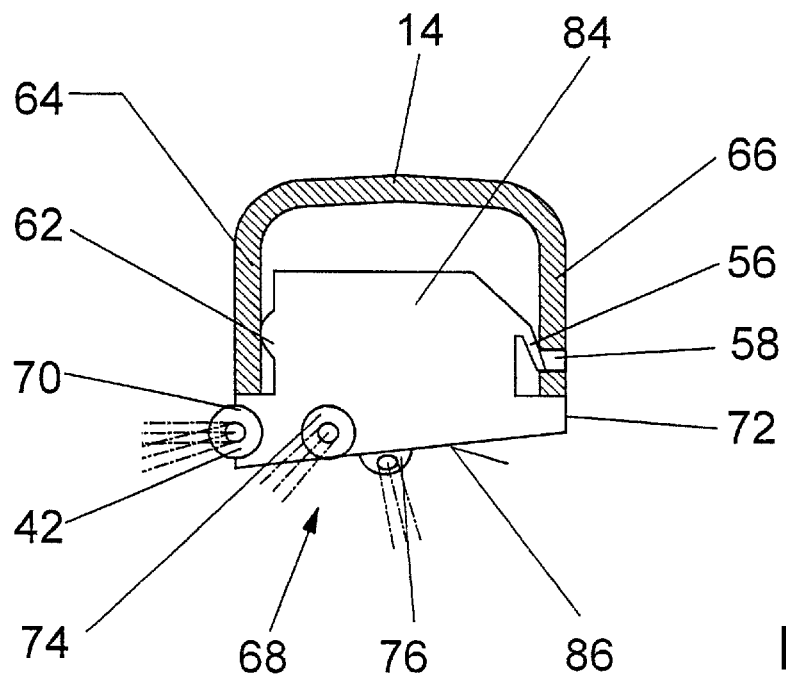
FIG. 5, a variant of FIG. 4.

With one part, the nozzle bodies engage between the side walls 64, 66 of the U-shaped profile, while a lower part 68, which has spray nozzles 42, 74 and 76, protrudes from the profile toward the wiping field 46. As a result, the spray nozzles 42, 74, 76 can be disposed and oriented freely, regardless of the orientation and design of the hinge part 14, for example on one side 70 in the longitudinal direction 80 of the wiper blade 22 and/or on one face end 84 and/or on a bottom 86 (FIG. 5). The disposition of the spray nozzle 76 on the bottom 86 of the nozzle body 38, 40 is especially expedient if the hinge part 14 and/or the wiper rod 36 extends at least partly offset from the wiper blade 22 in the starting direction 78 of the wiper arm 10. In that case, a spray stream 44 of the spray nozzle 74 can be aimed virtually parallel at the wiper blade 22 and can meet the wiping field 46 with only a short stream length. Since furthermore the spray stream 44 is protected from above by the hinge part 14 and/or the wiper rod 36, it is hardly affected by the relative wind, even at relatively high vehicle speeds. The location of the wiper arm 10 relative to the wiper blade 22 can be attained for instance by means of a double bend 82 of the wiper rod 36.

One or more spray nozzles 42, 74, 76 with one or more spray streams 44, 90 can be provided on each of the sides 40, 70, 86, respectively, of the nozzle bodies 38, 40. Expediently, however, at least one spray stream 44 should form an only small angle a with the longitudinal direction 80 of the wiper blade 22 and should strike the wiping field 46 in the vicinity of an inner circle 88 of the wiper blade 22.

The spray nozzles 42 are advantageously disposed on the side 70 of the nozzle body 38, 40 that is located in the starting direction 78 of the wiper arm 10, so that the wiping field 46 is already wetted when the wiper arm 10 starts. Furthermore, the side 70 is made wider, so that it protrudes farther than the opposite side 72 and thus affords more space for the disposition of the spray nozzles 42. The hinge part 14 or the wiper rod 36 can be crossed accordingly, to guide the bottom 86 approximately parallel to the wiping field 46 and to incline the top side of the hinge part 14 counter to the relative wind.

Figure 4:
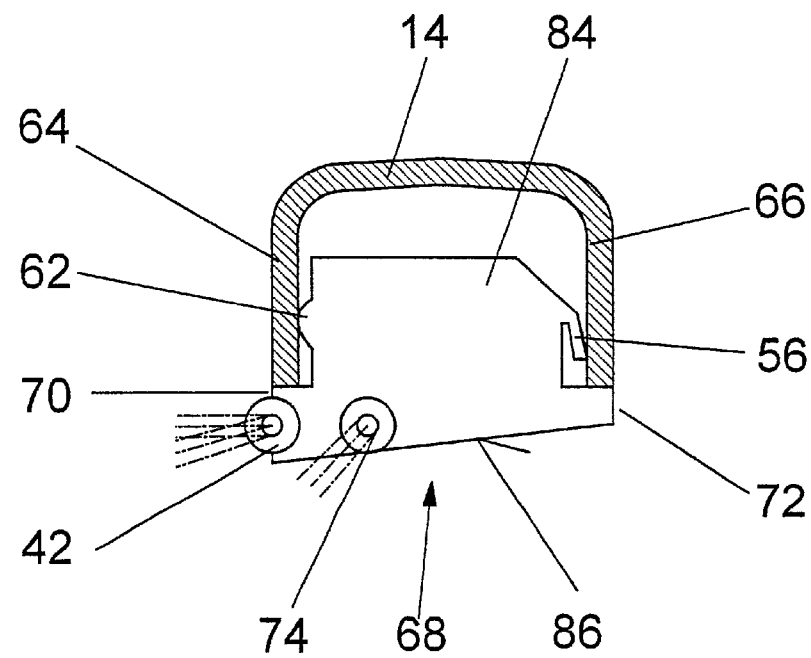
FIG. 4, an elevation view in the direction of the arrow IV in FIG. 3.
Figure 6:
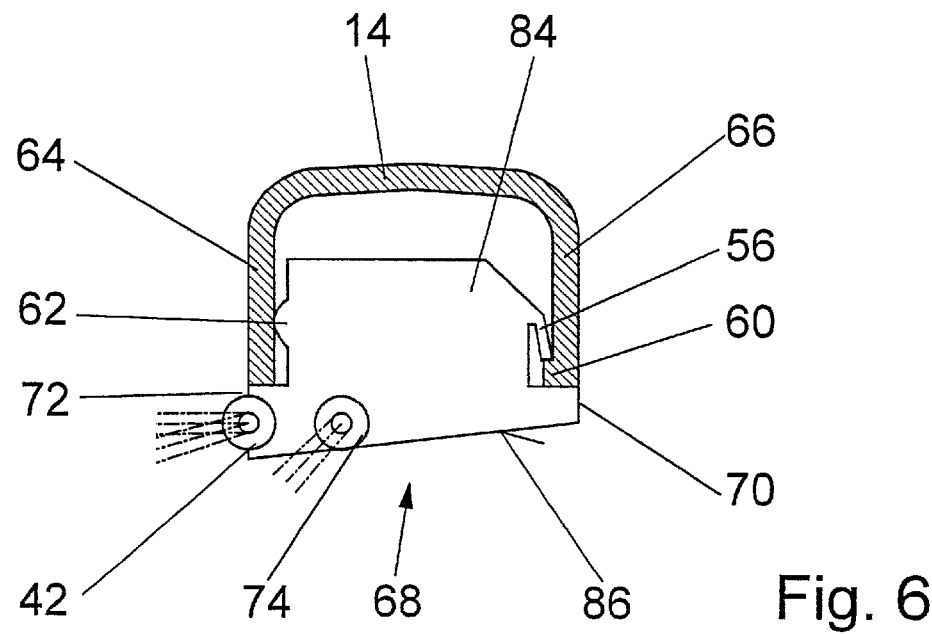
FIG. 6, a further variant of FIG. 4.

The nozzle bodies 38, 40 are retained nonpositively (FIG. 4) in the U-shaped profile of the hinge part or the wiper rod 36, in that a spring tongue 56, which is braced on a side wall 66 of the U-shaped profile, presses the nozzle body 38, 40 against the opposite side wall 64. The nonpositive engagement is reinforced, in the version of FIG. 5, by a positive engagement in that the spring tongue 56 engages an opening 58 of the side wall 66. In FIG. 6, a supplementary positive engagement is provided in that the spring tongue 56 engages an inward-pointing heel 60 of the side wall 66 from behind. The heel 66 can be made by canting part of the side wall 66 inward.

On the side, the nozzle body 38, 40 has a bead 62 in the longitudinal direction 80. The linear contact thus formed with the side wall 64 allows pivoting of the nozzle body 38, 40 about the longitudinal axis, so that regardless of angle tolerances, the nozzle body 38, 40 rests with its bearing faces 52, 54 flush on the side walls 64 and 66 of the hinge part 14 and wiper rod 36, and is oriented toward the hinge part 14 and the wiper rod 36.

REFERENCE NUMERALS

10 Wiper arm

12 Fastening part

14 Hinge part
16 Drive shaft
18 Swivel joint
20 Tension spring
22 Wiper blade
24 Wiper strip
26 Middle bracket
28 Intermediate bracket
30 Claw bracket
32 Hinge pin
34 Hinge bolt
36 Wiper rod
38 Nozzle body
40 Nozzle body
42 Spray nozzle
44 Spray stream
46 Wiping field
48 Water line
50 Connecting piece
52 Bearing face
54 Bearing face
56 Spring tongue
58 Opening
60 Heel
62 Bead
64 Side wall
66 Side wall
68 Lower part of the nozzle body
70 Side
72 Side
74 Spray nozzle
76 Spray nozzle
78 Starting direction
80 Longitudinal direction
82 Double bend
84 Face end
86 Bottom
88 Inner circle
90 Spray stream

What is claimed is:

1. A wiper arm (10) comprising, a fastening element (12) and a hinge part (14), said hinge part (14) pivotably connected to said fastening element (12) by a swivel joint (18), and further comprising a wiper rod (36) to which a wiper blade (22) is pivotably connected, the hinge part (14) having a U-shaped profile open toward a wiping field (46) and carrying at least one spray nozzle (42), wherein the spray nozzle (42) is placed in a lower part (68) of a nozzle body (38, 40), said nozzle body inserted into the U-shaped profile, wherein said lower part (68) of said nozzle body protrudes toward the wiping field (46), wherein the nozzle body (38,40) has long sides, wherein said long sides have bearing faces (52, 54), wherein said bearing faces (52, 54) rest on face ends of side walls (64, 66) of the U-shaped profile.

2. The wiper arm (10) of claim 1, wherein the spray nozzle (38, 40) is disposed on a side of the nozzle body (38, 40) located in a starting direction (78) of the wiper arm (10).

3. The wiper arm (10) of claim 2, wherein the lower part protruding out of the hinge part (14) protrudes farther on a side (70) with the spray nozzle (42) than on an opposite side (72).

4. The wiper arm (10) of claim 1, wherein the spray nozzle (38, 40), with at least one spray stream (44), forms a small angle a of less than 45° with a longitudinal direction of the wiper blade (22).

5. The wiper arm (10) of claim 1, wherein the wiper rod (36) is formed onto the hinge part (14), and the nozzle body (40) is inserted into the wiper rod (36).

6. The wiper arm (10) of claim 5, wherein a further nozzle body (38) is provided in the hinge part (14) and is rigidly joined to the nozzle body (40) in the wiper rod (36).

7. The wiper arm (10) of claim 1, wherein said wiper arm extends offset from the wiper blade (22) in a starting direction (78).

8. The wiper arm (10) of claim 7, wherein the wiper rod (36) is bent in a double bend.

9. The wiper arm (10) of claim 7, wherein the nozzle body (38, 40) has a spray nozzle (76) on its bottom.

10. The wiper arm (10) of claim 1, wherein the nozzle body has a spray nozzle (74) on a face end pointing in a longitudinal direction (80) of the wiper blade.

11. A wiper arm (10) comprising, a fastening element (12) and a hinge part (14), said hinge part (14) pivotably connected to said fastening element (12) by a swivel joint, and further comprising a wiper rod (36) to which a wiper blade (22) is pivotably connected, the hinge part (14) having a U-shaped profile open toward a wiping field (46) and carrying at least one spray nozzle (42), wherein the spray nozzle (42) is placed in a lower part (68) of a nozzle body (38, 40), said nozzle body inserted into the U-shaped profile, wherein said lower part (68) of said nozzle body protrudes toward the wiping field (46), wherein said nozzle body (38, 40) is retained with a lateral spring tongue (56) on a side wall of the hinge part (14).

12. The wiper arm (10) of claim 11, wherein the spring tongue (56) snaps into an opening (58) of the side wall (64).

13. The wiper arm (10) of claim 11, wherein the side wall (66) of the hinge part (14), in a region of the nozzle body (38, 40), has a heel (60) facing inward, wherein said heel (60) is engaged from behind the spring tongue (56).

14. The wiper arm (10) of claim 11, wherein the nozzle body (38, 40), on a side opposite the spring tongue (56), rests with a longitudinally extending bead (62) on the side wall (64).

* * * * *